United States Patent Office 3,329,716
Patented July 4, 1967

3,329,716
CHEMICAL PROCESS
Bernard Grushkin and Rip G. Rice, Silver Spring, Md., assignors to W. R. Grace & Co., New York, N.Y., a corporation of Connecticut
No Drawing. Filed Oct. 18, 1963, Ser. No. 317,115
5 Claims. (Cl. 260—551)

The present invention relates to the production of phosphorus-nitrogen compounds, and more specifically to an improved method for preparing superior yields of the compound

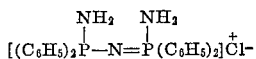

It is known that Compound I (as the above compound will be referred to hereinafter) may be prepared by reacting ammonia with diphenylphosphorus trichloride. Such a synthesis is disclosed by Bezman & Smalley in Chem. & Industry (London), p. 839 (1960). Sisler, Ahuja and Smith have also shown in Inorganic Chemistry I, 84, (1962) that chloramine will react with diphenylphosphorus chloride ($\phi_2$PCl) to form Compound I along with various amounts of cyclic diphenylphosphonitriles.

While the above prior art procedures result in the production of considerable amounts of Compound I, they possess the disadvantage of having to deal with gaseous ammonia and chloramine. Such processes are inherently difficult to operate efficiently on a commercial scale.

It is therefore an object of the present invention to provide a novel and improved method for preparing Compound I in good yields.

It is a further object to provide a method for preparing Compound I which is readily adaptable to efficient large scale production methods.

These and still further objects of the present invention will become readily apparent to one skilled in the art and the following detailed description and specific examples.

Broadly, the present invention contemplates the process for preparing Compound I which comprises reacting diphenylphosphorus trichloride ($\phi_2$PCl$_3$) with finely divided ammonium chloride (NH$_4$Cl) in the presence of an inert liquid reaction medium, preferably a non-polar hydrocarbon.

More specifically, we have found that exceptionally good yields of Compound I may be prepared by reacting $\phi_2$PCl$_3$ with solid finely divided NH$_4$Cl having an average particle size of less than about 10 microns at temperatures ranging from about 50 to about 130° C. in the presence of a non-polar liquid hydrocarbon. By this procedure yields of Compound I exceeding 95% of theory are readily and economically obtained.

The diphenylphosphorus trichloride ($\phi_2$PCl$_3$) used in the practice of the present invention, is conveniently obtained by chlorinating diphenylphosphorus chloride ($\phi_2$PCl) with gaseous chlorine in the presence of an inert solvent, preferably a solvent which may subsequently be used in the production of Compound I. This chlorination process is well known to those skilled in the art and takes place quantitatively at room temperature when gaseous chlorine is passed through an appropriate solution of $\phi_2$PCl. Excess chlorine present subsequent to the chlorination is removed conveniently by passing an inert gas, such as nitrogen through the reaction mixture until the reaction mixture becomes colorless.

The ammonium chloride used in the practice of this invention is preferably in an extremely finely divided state. Generally speaking, the particle size range of the ammonium chloride particles is preferably below about 10 microns. Ammonium chloride of this particle size may be prepared by any means known to those skilled in the art. However, it is most conveniently prepared by reacting gaseous streams of ammonia in hydrogen chloride in the presence of a rapidly agitated inert solvent. In this manner a finely divided dispersion of ammonium chloride having an average particle size range of below 10 microns is conveniently prepared. Furthermore, such a process very conveniently provide a dispersion of ammonium chloride particles in an inert solvent of the type which is used to carry out the production of Compound I. Alternatively, the finely divided ammonium chloride may be prepared by the grinding of commercially available granular ammonium chloride which normally possesses a particle size in the range of 1 mm. and larger. Extended grinding of such granular ammonium chloride will ultimately result in a very fine size particular material which may be used in the practice of the present invention. However, extended grinding periods are required with the attendant danger of absorption of water, and it is generally found more convenient to prepare the particulate ammonium chloride by the reaction of the gaseous components.

Subsequent to the formation of a $\phi_2$PCl$_3$ solution and a dispersion of ammonium chloride in an inert solvent, the two mixtures may be combined and heated to form the desired product. Preferably, the molar ratios of $\phi_2$PCl$_3$ and NH$_4$Cl will range from about 0.20 to about 0.66 mole of $\phi_2$PCl$_3$ for each mole of ammonium chloride. This molar ratio is not critical, however, it is found that an excess of the less expensive ammonium chloride ensures thorough and complete reaction of the more expensive $\phi_2$PCl$_3$.

Preferably, in the practice of the invention the two reactants, namely the $\phi_2$PCl$_3$ and the ammonium chloride are admixed immediately prior to heating. That is, it is generally found that superior yields are obtained if slow addition of either reactant to the other is avoided. Subsequent to combination of the reactants, the admixture is heated to a temperature of from about 50 to about 150° C. It is generally found using temperatures within this range from about 24 to about 48 hours are required to obtain substantially complete conversion of the $\phi_2$PCl$_3$ to the desired Compound I. Generally speaking, it is desired to conduct the heating while vigorously admixing the reactants. In this way a uniform dispersion of ammonium chloride, which is present in the solid phase during the reaction, is maintained.

Solvents which are used in the practice of the invention may be broadly described as non-polar hydrocarbons and halogenated hydrocarbons which are chemically inert to the reactants. Particularly good reaction solvents are alkanes having the general formula C$_n$H$_{(n+2)}$ wherein $n$ has the value of from about 6 to about 10. Halogenated hydrocarbons which may be used include both halogenated aliphatics and aromatics. The halogenated compounds may be portrayed as possessing the formulas

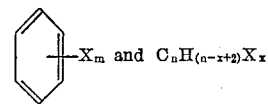

Wherein $m$ has a value of from 1 to 3, $n$ has a value of from 6 to 10, X represents halogen and $x$ has a value of from 1 to 4.

Specific examples of suitable reaction media are straight and branched chain isomers of hexane, heptane, and octane, tetrachloroethylene, tetrachloroethane, as well as chlorinated benzene compounds, such as chlorobenzene, 1,2,4-trichlorobenzene, etc. Of the above specified hydrocarbon reaction media, it is generally found that the non-chlorinated aliphatic hydrocarbons, due to their extreme non-polar characteristics, produce the most satisfactory results. As a matter of fact, when, for example, n-heptane is used as a reaction medium and extreme care is taken to obtain completely pure reactants, it is found that practically quantitative yields of Compound I may be obtained.

Subsequent to reaction, Compound I, which precipitates during the reaction, may be readily obtained from the reaction mixture by a simple filtration step. This filtration results in the obtaining of a solid mixture comprising Compound I and excess ammonium chloride which is preferably present in the initial reaction mixture. Compound I, which is readily soluble in chloroform is then extracted from the ammonium chloride. The chloroform is then evaporated which leaves Compound I in a relatively pure state. Alternately, excess ammonium chloride may be removed from the filtered reaction mixture by extraction with water. Compound I, which is only slightly soluble in cold water, and resistant to hydrolysis, is not effected by this procedure.

Compound I is a valuable intermediate for the production of phenylsubstituted phosphonitrilic trimers and tetramers. When Compound I is heated to a temperature of about 200° C., phosphonitrilic trimers and tetramers form quantitatively. Furthermore, there has been recently disclosed that Compound I may be reacted with phosphorous pentachloride and phenylphosphorous tetrachloride to obtain chloro-substituted phosphonitrilic trimers and tetramers. These compounds find wide utility in the formation of heat-resistant polymers.

Having described the basic aspects of the present invention, the following detailed examples are given to illustrate embodiments thereof.

*Example I*

A solution of 50 mmoles of $\phi_2 PCl$ in 0.5 l. of normal heptane was chlorinated until $\phi_2 PCl_3$ was quantitatively formed. The solution was maintained under a dry nitrogen atmosphere at all times. In a separate flask gaseous ammonia and hydrogen chloride were bubbled through 1.0 l. of n-heptane until 600 mmoles of ammonium chloride had been formed. The $\phi_2 PCl_3$ solution was then added to the ammonium chloride suspension and the mixture agitated rapidly, and the temperature raised to reflux at 95° C. A stream of nitrogen was passed through the mixture to sweep the evolved hydrogen chloride into a water trap containing an acid-base indicator. The HCl was titrated intermittently with caustic. After 20 hours HCl ceased to evolve, at which time the mixture was filtered while hot. The filtrate contained 2.0 grams (9.8 mmoles) of a solid characterized as $\phi_2 P(O)OH$. This was attributed to the presence of trace amounts of water in the system.

The precipitate containing excess ammonium chloride in product I was extracted with chloroform. The chloroform solution was then evaporated to dryness leaving 9.8 g. (87%) of a white powder, M.P. 218–233° C. Upon crystallization from methanol, the product melted at 241–242° C. The elemental analysis and the infrared spectrum conformed with that of Compound I.

*Example II*

50 mmoles of $\phi_2 PCl_3$ and 300 mmoles of finely divided ammonium chloride (prepared by the gaseous reaction of $NH_3$ and HCl) were combined and heated 5 days at 61° C. in 500 ml. chlorobenzene at which time no more HCl was evolved. From the reaction mixture 70% of the product was recovered as Compound I. The remainder consisted of 20% cyclic tetrameric diphenylphosphonitrile plus an additional 10% of product which could not be resolved.

*Example III*

A mixture containing 50 mmoles of $\phi_2 PCl_3$ and a large excess of finely divided ammonium chloride was heated in 600 ml. of chlorobenzene at reflux (131° C.) until no more HCl was given off. This reaction took approximately 2.5 hours. 53% yield of Compound I was obtained. Furthermore 10% of trimeric diphenylphosphonitrile were also obtained.

*Example IV*

A reaction of 50 mmoles of $\phi_2 PCl_3$ with finely divided ammonium chloride in 600 ml. of 1,2,4-trichlorobenzene was run at reflux 212° C. In this run, 54% of the total product recovered was cyclic trimeric diphenylphosphononitrile $(NP\phi_2)_3$. An additional 18% of the cyclic tetramer $(NP\phi_2)_4$ was also recovered. No Compound I was isolated. This example serves to illustrate that at temperatures of the order of 200° C. formation of cyclic trimer and tetramer is favored without the formation of Compound I. This can be expected in that at 200° C., it is generally known that Compound I reacts to form trimer and tetramer.

*Example V*

The procedure of Example I was repeated, employing n-heptane which was dried over calcium hydride, and $\phi_2 PCl$ which was freshly distilled. In this repeat example no $\phi_2 P(O)OH$ was isolated and a substantial 100% yield of Compound I was obtained. This example served to illustrate the desirability of maintaining strict anhydrous conditions in the reaction system.

*Example VI*

A solution of 50 mmoles of $\phi_2 PCl_3$ and 100 mmoles of granular commercially available $NH_4Cl$ having an average particle size in the order of 1 mm. was refluxed in 400 ml. of chlorobenzene. After 18 hours, HCl ceased to evolve. A total of 166 mmoles of HCl was titrated. After filtering off the unreacted ammonium chloride, trimeric and tetrameric diphenylphosphonitriles were recovered from the filtrate by fractional precipitation. A total of 52% cyclic trimer and 18% cyclic tetramer was formed based on the total phosphorus reactant. Substantially no Compound I was obtained. This example illustrates that finely divided ammonium chloride is essential for the practice of the present invention. Granular ammonium chloride which is distinguished by a much larger particle size then the presently intended finely divided ammonium chloride produces substantially no Compound I.

*Example VII*

A solution of 1 mole $\phi_2 PCl_3$ in 1.7 liters of chlorobenzene was added slowly at a rate of 0.01 mole per minute to a refluxing suspension of about 4 moles of ammonium chloride made by the reaction of ammonia and hydrogen chloride in 7.5 l. of chlorobenzene. After 100 hours, HCl ceased to evolve from the reaction mixture. A total of 3.3 moles of HCl was titrated. From the result solution, 18% Compound I was obtained, as well as 16% trimer and 22% tetramer. This example illustrates, in contrast to Example III, that as a preferred method for practicing the present invention, slow addition of the $\phi_2 PCl_3$ to the ammonium chloride should be avoided.

The above specific examples clearly illustrate that good yields of Compound I may be readily obtained by using the process set forth herein. By selecting a desirable solvent, such as n-heptane, and using the fine size ammonium chloride disclosed herein, quantitative yields of Compound I may be obtained in an anhydrous reaction system.

We claim:

1. The method of preparing the compound

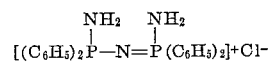

which comprises reacting diphenylphosphorus trichloride with finely divided ammonium chloride having an average particle size of less than about 10 microns suspended in an inert liquid reaction medium at a temperature of from about 50 to about 150° C., and recovering said compound from the reaction medium.

2. The method of claim 1 where said reaction medium possesses the formula $$C_nH_{(n+2)}$$

wherein $n$ has a value of from about 6 to about 10.

3. The process of claim 1 wherein the reaction medium is n-heptane.

4. The process of claim 1 wherein said ammonium chloride is prepared by combining streams of gaseous ammonium and hydrogen chloride in said reaction medium.

5. The process of claim 1 wherein said diphenylphosphorus trichloride and said finely divided ammonium chloride are admixed rapidly so as to avoid the slow addition of one to the other.

References Cited

UNITED STATES PATENTS

| | | | |
|---|---|---|---|
| 2,853,517 | 9/1958 | Fitzgerald et al. | 260—551 |
| 3,080,422 | 3/1963 | Bezman et al. | 260—551 |
| 3,138,638 | 6/1964 | Bezman et al. | 260—551 |

OTHER REFERENCES

Kendall, General Chemistry, Revised Edition, (D. Appleton-Century Company) (1927) p. 414.

Shaw et al., Chemical Rev., vol. 62, pp. 257–58 (June 1962).

WALTER A. MODANCE, *Primary Examiner.*

H. I. MOATZ, *Assistant Examiner.*